US006902282B2

(12) United States Patent
Cook

(10) Patent No.: US 6,902,282 B2
(45) Date of Patent: Jun. 7, 2005

(54) FAST, WIDE-FIELD-OF-VIEW, RELAYED MULTIMIRROR OPTICAL SYSTEM

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 53 days.

(21) Appl. No.: 10/104,424

(22) Filed: Mar. 22, 2002

(65) Prior Publication Data

US 2003/0179444 A1 Sep. 25, 2003

(51) Int. Cl.[7] .................................................. G02B 5/10
(52) U.S. Cl. ...................... 359/859; 359/861; 359/729; 359/731
(58) Field of Search ................................. 359/365, 366, 359/728, 399, 726, 727, 729, 730, 731, 850, 857, 858, 859, 860, 861

(56) References Cited

U.S. PATENT DOCUMENTS

| 4,240,707 A | 12/1980 | Wetherell et al. ........... 359/859 |
| 4,598,981 A | 7/1986 | Hallam et al. .............. 359/366 |
| 4,834,517 A | 5/1989 | Cook .......................... 359/366 |
| 5,078,502 A | * 1/1992 | Cook .......................... 359/366 |
| 5,550,672 A | 8/1996 | Cook .......................... 359/365 |
| 6,072,852 A | * 6/2000 | Hudyma ...................... 378/34 |
| 6,333,811 B1 | * 12/2001 | Tatian et al. ................ 359/366 |
| 6,633,431 B2 | * 10/2003 | Akiyama .................... 359/364 |

* cited by examiner

Primary Examiner—Thong Nguyen
Assistant Examiner—Arnel C. Lavarias
(74) Attorney, Agent, or Firm—John E. Gunther; Leonard A. Alkov; Karl A. Vick

(57) ABSTRACT

An all-reflective, relayed optical system is arranged along a beam path. The optical system includes a first mirror having positive optical power, and a second mirror having a negative optical power, wherein the second mirror receives the beam path reflected from the first mirror and wherein an intermediate image is formed after the beam path reflects from the second mirror. The optical system further includes a third mirror having positive optical power, wherein the intermediate image on the beam path is reflected from the third mirror; a fourth mirror having a negative optical power, wherein the beam path reflected by the third mirror is reflected by the fourth mirror, and a fifth mirror having positive optical power, wherein the beam path reflected by the fourth mirror is reflected by the fifth mirror to an image location.

18 Claims, 3 Drawing Sheets

| IDENTIFICATION | RADIUS | K | D | E | F | G | THICKNESS |
|---|---|---|---|---|---|---|---|
| FIRST MIRROR 24 | -2.73259 | -0.439056 | 8.62 x10⁻⁵ | -.9999 x10⁻⁵ | 2.867 x10⁻⁶ | 7.748 x10⁻⁷ | -1.15380 |
| SECOND MIRROR 26 | -1.37740 | -5.065483 | -6.143 x10⁻² | -8.083 x10⁻³ | 2.763 x10⁻² | -9.856 x10⁻³ | 0.361711 |
| THIRD MIRROR 32 | -2.64802 | 0.216681 | -1.228 x10⁻³ | 1.159 x10⁻² | -1.179 x10⁻² | 9.321 x10⁻³ | -1.12204 |
| FOURTH MIRROR 34 | -1.58542 | 3.712311 | 1.108 x10⁻² | 6.689 x10⁻² | 1.954 x10⁻² | 0.6490861 | 1.22578 |
| FIFTH MIRROR 36 | -1.86883 | 0.113017 | 1.800 x10⁻⁴ | -6.052 x10⁻⁵ | 2.669 x10⁻⁴ | -1.842 x10⁻⁴ | -1.23033 |

FIG. 3

FAST, WIDE-FIELD-OF-VIEW, RELAYED MULTIMIRROR OPTICAL SYSTEM

This invention relates to an all-reflective, relayed optical system and, more particularly, to a multimirror optical system with a wide field of view in the low F-number range.

BACKGROUND OF THE INVENTION

All-reflective optical systems are desirable for many wideband optical applications because they reflect all wavelengths of incident light equally, unlike refractive systems wherein the refraction is wavelength dependent. Reflective optical systems may also be made quite compact. However, reflective optical systems are typically more limited in their major-axis fields of view than are refractive systems, due to the poor image quality, image distortions, and potential obscuring of the ray paths when the wide field of view is attempted. Only one large dimension of field of view is normally required in many optical systems, in the "major axis". A simultaneously large minor-axis field of view is either not necessary because the optical system is scanned along a direction, as in satellite-based earth-sensing applications, or because the minor-axis field of view is supplied by angularly scanning the optical system along the minor axis using a mechanical scanning device.

For example, high-image-quality reflective optical systems are available for major-axis fields of view of up to about 12–14 degrees. These optical systems typically use three or four mirrors, such as three powered mirrors and an aspheric corrector mirror. However, analysis shows that these mirror systems cannot provide good-quality optical images for fields of view greater than about 15 degrees and about 20 degrees, and certainly not for fields of view greater than about 25 degrees. In the range of these higher fields of view, the image quality is too degraded by substantial image aberrations and distortions to be acceptable.

There is a need for an all-reflective optical system having a wider field of view than available with current optical systems. The present invention fulfills this need, and further provides related advantages.

SUMMARY OF THE INVENTION

The present invention provides an all-reflective, relayed optical system operable to provide a major-axis field of view of greater than about 15 degrees, preferably greater than about 20 degrees, and even greater than about 25 degrees. The optical system has a fast optical speed of about F/2.5 to about F/13 or less (i.e., smaller F-numbers). The image quality is diffraction limited at a wavelength of about 1 micron across the field of view. The image quality is good, even at the limits of the field of view, with low pupil aberrations and low field distortions of less than one percent. The geometry of the optical system is such that the image location is well spaced from the optical axis of the optical system to provide room for a detector, and specifically a detector oriented so that the image is substantially normally incident upon the detector. The optical powers of the mirrors may be selected so that they sum to substantially zero to obtain a planar image. There is a real entrance pupil, and there is a long input eye relief (the distance from the real entrance pupil to the first optical element).

In accordance with the invention, an all-reflective optical system is arranged along a beam path. The optical system comprises a multimirror reflective objective optical component forming an intermediate image in the beam path. The mirrors of the objective optical component are powered. The optical system further includes a multimirror relay optical component that relays the intermediate image to an image location in the beam path. The mirrors of the relay optical component are also powered. The optical system has a field of view in a major axis exceeding about 15 degrees, preferably exceeding about 20 degrees, and most preferably exceeding about 25 degrees.

In one embodiment, the objective optical component comprises a first mirror having positive optical power, and a second mirror having negative optical power. The second mirror receives the beam path reflected from the first mirror, and the intermediate image is formed after the beam path reflects from the second mirror. The relay optical component comprises a third mirror having positive optical power, wherein the intermediate image on the beam path is reflected from the third mirror. A fourth mirror has negative optical power, wherein the beam path reflected by the third mirror is reflected by the fourth mirror. A fifth mirror has positive optical power, wherein the beam path reflected by the fourth mirror is reflected by the fifth mirror to the final image location. A real image of the real entrance pupil is formed by the combined effects of all five mirrors, in the beam path between the fifth mirror and the final image. This location is well suited for placement of the system aperture stop. There may be an unpowered mirror in the beam path serving as a fold mirror. Desirably, the sum of the optical powers of all of the mirrors is substantially zero ("zero Petzval sum"), so that the final image is planar.

Stated alternative, an all-reflective, relayed optical system arranged along a beam path comprises a first mirror having positive optical power; a second mirror having negative optical power, wherein the second mirror receives the beam path reflected from the first mirror and wherein an intermediate image is formed after the beam path reflects from the second mirror; a third mirror having positive optical power, wherein the intermediate image on the beam path is reflected from the third mirror; a fourth mirror having negative optical power, wherein the beam path reflected by the third mirror is reflected by the fourth mirror; and a fifth mirror having positive optical power, wherein the beam path reflected by the fourth mirror is reflected by the fifth mirror to an image location. Features discussed elsewhere herein are applicable to this version of the optical system.

Thus, an all-reflective, relayed optical system comprises a set of five powered mirrors whose powers sum to substantially zero and which are arranged such that a beam path is reflected from a first mirror to a second mirror to a third mirror to a fourth mirror to a fifth mirror and thence to an image plane. An intermediate image is formed in the beam path after reflection from the second mirror and is relayed to the image plane by the third mirror, the fourth mirror, and the fifth mirror. A major-axis field of view of the optical system is at least about 20 degrees, and an optical speed of the optical system is from about F/2.5 to about F/3. Features discussed elsewhere herein are applicable to this version of the optical system.

The present optical system thus provides a wide field of view with low optical aberrations and distortion, even for a fast optical system. The geometric arrangement of the components is good, avoiding any obscuring of the optical path and allowing for the placement of a detector at the image location. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3 is a table setting forth an optical prescription of a preferred embodiment of the all-reflective, relayed optical system of FIGS. 1–2.

DETAILED DESCRIPTION OF THE INVENTION

Figure 1:
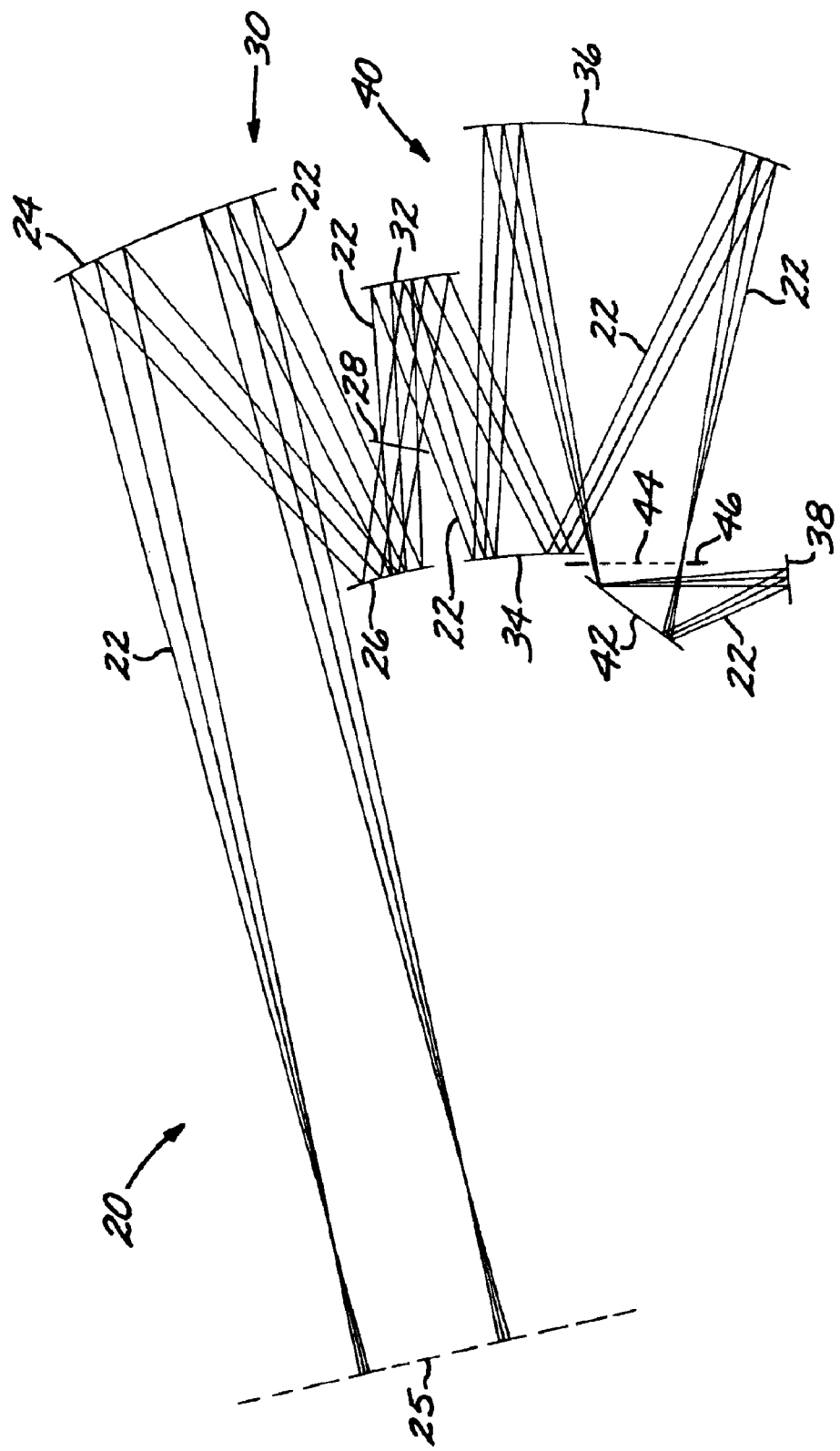
FIG. 1 is an elevational schematic view (in the minor field of view) of an all-reflective, relayed optical system.
Figure 2:
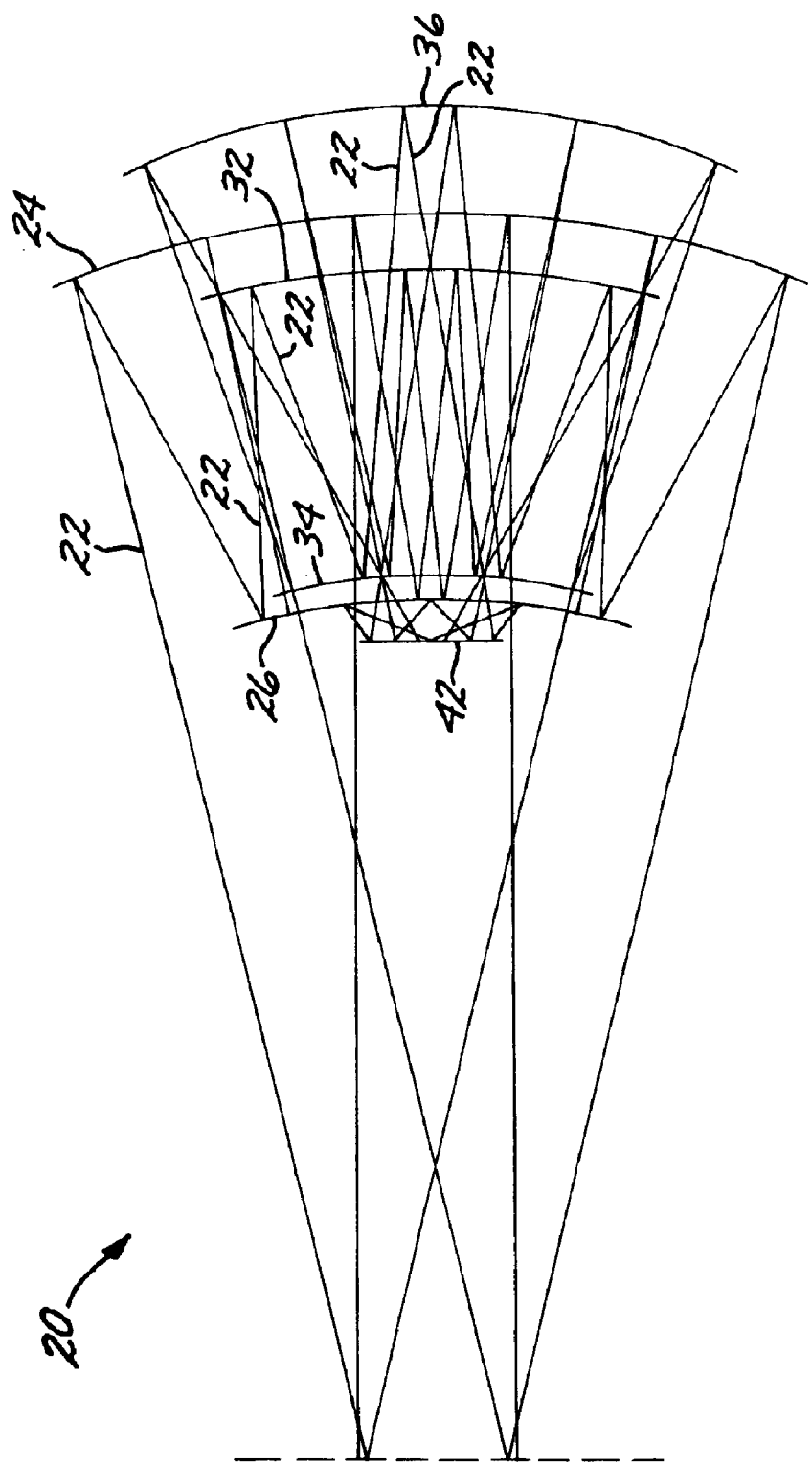
FIG. 2 is a plan schematic view (in the major field of view) of the optical system of FIG. 1.

FIGS. 1–2 depict an all-reflective, relayed optical system 20 arranged along a beam path 22. FIG. 1 is an elevational view that shows the field of view in the minor axis, and FIG. 2 is a plan view that shows the field of view in the major axis. In this embodiment, the field of view in the major axis is greater than the field of view in the minor axis.

The all-reflective optical system 20 includes a first mirror 24 receiving the beam path 22 from a real entrance pupil 25. The first mirror 24 has positive optical power. As will be demonstrated in an example whose prescription is set forth in FIG. 3 and discussed below, the eye relief (distance between the real entrance pupil 25 and the first mirror 24) is large.

A second mirror 26 has negative optical power. The second mirror 26 receives the beam path 22 reflected from the first mirror 24. The first mirror 24 and the second mirror 26 cooperate to form an intermediate image 28 after the beam path 22 reflects from the second mirror 26. A field stop may be located at the intermediate image 28.

The first mirror 24 and the second mirror 26 together function as a multimirror reflective objective optical component 30 that forms the intermediate image 28 in the beam path 22. (As used herein, "multimirror" requires two or more mirrors.)

A third mirror 32 has positive optical power. The intermediate image 28 on the beam path 22 is reflected from the third mirror 32.

A fourth mirror 34 has negative optical power. The beam path 22 previously reflected by the third mirror 32 is reflected by the fourth mirror 34.

A fifth mirror 36 has positive optical power. The beam path 22 previously reflected by the fourth mirror 34 is reflected by the fifth mirror 36 to an image location 38.

A real image of the real entrance pupil 25 is formed at a re-imaged pupil location 44 between the fifth mirror 36 and the image location 38. A system aperture stop 46 may be placed at this re-imaged pupil location 44.

The third mirror 32, fourth mirror 34, and fifth mirror 36 together function as a multimirror relay optical component 40 that relays the intermediate image 28 to the image location 38 in the beam path 22.

Optionally, there may be an unpowered mirror 42 in the beam path 22 between the fifth mirror 36 and the image location 38, serving as a fold mirror. The unpowered mirror 40 is not one of the five-mirrors 24, 26, 32, 34, and 36 of the powered optical system 20, but is placed to redirect the beam path 22 to a detector or the like.

Desirably, the sum of the optical powers of all of the mirrors 24, 26, 32, 34, and 36 (and optional mirror 42) is substantially zero. This satisfies the Petzval sum criterion of substantially zero to form a flat image at the image location 38.

Thus, the beam path 22 is reflected from the first mirror 24 to the second mirror 26 to the third mirror 32 to the fourth mirror 34 to the fifth mirror 36 and thence to the image location 38, which is an image plane when the Petzval sum of the powers of the five mirrors is substantially zero. The intermediate image 28 is formed along the beam path 22 between the second mirror 26 and the third mirror 32, and is relayed to the image location 38 by the third mirror 32, the fourth mirror 34, and the fifth mirror 36. The real entrance pupil 25 is re-imaged at the re-imaged pupil location 44.

An optical prescription for an example of the optical system 20 depicted in FIGS. 1–2 is set forth in FIG. 3, using the convention set forth in U.S. Pat. No. 5,550,672, whose disclosure is incorporated by reference. This prescription is normalized to a system focal length of 1.000. In these terms, the entrance pupil diameter is 0.400, the system speed is F/2.5, the field offset is −13.6704 degrees, the diameter of the aperture stop 46 is 0.26072, and the field of view is 3×26 degrees.

The field of view in at least one axis (the major axis) exceeds about 15 degrees, preferably exceeds about 20 degrees, and most preferably exceeds about 25 degrees. Such large fields of view are important in scanning imaging applications, such as those where the optical system 20 is scanned across a scene. These large fields of view cannot be achieved with a conventional optical system. Even at these large major-axis fields of view, the image quality is diffraction limited at a wavelength of about 1 micron across the field of view. The image quality is good, even at the limits of the field of view, with low pupil aberrations and low field distortions of less than one percent.

The present optical system 20 exhibits all of the defining characteristics and resulting benefits of a relayed optical form. It has a real entrance pupil that is reimaged (or relayed) to a real aperture stop located between the last powered mirror and the final image plane, and it has an intermediate image formed within the optical system prior to the formation of the aperture stop and final image. The main benefits of a relayed optical system are threefold. First, the arrangement aids in the suppression of unwanted stray light by compartmentalizing the optical path into several well-defined regions: the region between the entrance pupil and the field stop (located at the intermediate image), the region between the field stop and the aperture stop, and the region between the aperture stop and the final image. Second, the arrangement provides all of the features necessary to establish complete cold shielding for the low background operation of infrared focal plane arrays: with the cold stop defined at the aperture stop location, the infrared focal plane array views only cold high-emissivity surfaces back of the cold stop, or warm low-emissivity mirror surfaces in front of the cold stop. Direct view of any warm high-emissivity structure is precluded. Third, the arrangement, with its real entrance pupil being the image of a real aperture stop, allows this optical system to either follow another optical system (such as a high magnification a focal telescope) and be ideally matched pupil-to-pupil, or this optical system can directly view a scene through a small window or port that is minimally sized for the entrance pupil only, with no unwanted size growth associated with the large field of view. These features are not available in non-relayed optical systems.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An all-reflective, relayed optical system arranged along a beam path, the optical system comprising:
   a two-mirror reflective objective optical component forming an intermediate image in the beam path, wherein the mirrors of the objective optical component are powered; and
   a three-mirror relay optical component that relays the intermediate image to a second image location in the beam path, wherein the mirrors of the relay optical component are powered, and wherein the intermediate image is formed in the beam path after the objective optical component and before the relay optical component, and
   wherein the optical system has a field of view in a major axis exceeding about 15 degrees.

2. The optical system of claim 1, wherein the objective optical component comprises
   a first mirror having positive optical power, and
   a second mirror having negative optical power, wherein the second mirror receives the beam path reflected from the first mirror and wherein the intermediate image is formed after the beam path reflects from the second mirror.

3. The optical system of claim 1, wherein the relay optical component comprises
   a third mirror having positive optical power, wherein the intermediate image on the beam path is reflected from the third mirror,
   a fourth mirror having a negative optical power, wherein the beam path reflected by the third mirror is reflected by the fourth mirror, and
   a fifth mirror having positive optical power, wherein the beam path reflected by the fourth mirror is reflected by the fifth mirror to the image location.

4. The optical system of claim 1, wherein each mirror has an optical power, and wherein the sum of the optical powers of all of the mirrors is substantially zero.

5. The optical system of claim 1, wherein the optical speed of the optical system is about F/2.5 to F/3.0.

6. The optical system of claim 1, wherein the F-number of the system is less than about f/3.0.

7. The optical system of claim 1, further including an unpowered mirror in the beam path.

8. The optical system of claim 1, wherein the field of view in the major axis exceeds about 20 degrees.

9. The optical system of claim 1, wherein the field of view in the major axis exceeds about 25 degrees.

10. The optical system of claim 1, wherein an image quality of the image at the second image location is diffraction limited at a wavelength of about 1 micron across the field of view.

11. An all-reflective, relayed optical system arranged along a beam path, the optical system comprising:
    a first mirror having positive optical power;
    a second mirror having a negative optical power, wherein the second mirror receives the beam path reflected from the first mirror and wherein an intermediate image is formed after the beam path reflects from the second mirror;
    a third mirror having positive optical power, wherein the intermediate image on the beam path is reflected from the third mirror,
    a fourth mirror having a negative optical power, wherein the beam path reflected by the third mirror is reflected by the fourth mirror, and
    a fifth mirror having positive optical power, wherein the beam path reflected by the fourth mirror is reflected by the fifth mirror to an image location, wherein a field of view in a major axis exceeds about 25 degrees.

12. The optical system of claim 11, wherein the sum of the optical powers of all of the mirrors is substantially zero.

13. The optical system of claim 11, wherein the optical speed of the optical system is from about F/2.5 to about F/3.

14. The optical system of claim 11, wherein the F-number of the optical system is less than about F/3.

15. The optical system of claim 11, further including an unpowered mirror in the beam path.

16. An all-reflective, relayed optical system comprising a set of five powered mirrors whose powers sum to substantially zero and which are arranged such that a beam path is reflected from a first mirror to a second mirror to a third mirror to a fourth mirror to a fifth mirror and thence to an image plane,
    wherein an intermediate image is formed in the beam path after reflection from the second mirror and prior to reaching the third mirror, and is relayed to the image plane by the third mirror, the fourth mirror, and the fifth mirror,
    wherein a major-axis field of view of the optical system is at least about 15 degrees, and wherein an optical speed of the optical system is from about F/2.5 to about F/3.

17. The optical system of claim 16, further including an unpowered mirror in the beam path.

18. The optical system of claim 16, wherein an image quality of the image at the image location is diffraction limited at a wavelength of about 1 micron across the field of view.

* * * * *

UNITED STATES PATENT AND TRADEMARK OFFICE
CERTIFICATE OF CORRECTION

PATENT NO. : 6,902,282 B2
DATED : June 7, 2005
INVENTOR(S) : Lacy G. Cook

It is certified that error appears in the above-identified patent and that said Letters Patent is hereby corrected as shown below:

Column 1,
Line 3, please insert the following:
-- This invention was made with Government support under Subcontract No. TRW-61772CD29S, of Prime Contract No. F04701-99-C-0047, awarded by the Department of the Air Force. The government has certain rights in this invention. --.

Signed and Sealed this

Twenty-seventh Day of September, 2005

JON W. DUDAS
*Director of the United States Patent and Trademark Office*